United States Patent [19]
Nelson et al.

[11] 3,867,627
[45] Feb. 18, 1975

[54] FAST DATA ACQUISITION SYSTEM

[75] Inventors: Melvin A. Nelson; Terence J. Davies, Santa Barbara; John C. Clark, Pleasanton, all of Calif.

[73] Assignee: The United States of America as represented by the United States Atomic Energy Commission, Washington, D.C.

[22] Filed: Jan. 8, 1974

[21] Appl. No.: 431,809

[52] U.S. Cl. ............................................. 250/199
[51] Int. Cl. ............................................ H04b 9/00
[58] Field of Search ............ 250/199; 332/7.5, 7.51; 350/96 R, 169

[56] References Cited
UNITED STATES PATENTS

| | | |
|---|---|---|
| 3,168,611 | 2/1965 | Strauss................................ 250/199 |
| 3,488,503 | 1/1970 | Reich et al........................... 250/199 |
| 3,519,328 | 7/1970 | Grossman............................ 250/199 |
| 3,675,022 | 7/1972 | Nelson et al........................ 250/199 |

*Primary Examiner*—Benedict V. Safourek
*Assistant Examiner*—Jin F. Ng
*Attorney, Agent, or Firm*—John A. Horan; John A. Koch

[57] ABSTRACT

A data acquisition system for obtaining detailed information on fast, transient electrical signals. The signal to be recorded is applied as a traveling wave to a longitudinally extending electro-optical modulator. Light pulses are applied to a pluralilty of locations along one side of the modulator and modulated pulses representative of the intensity of the electrical signal at those locations received on the opposite side and further processed such as by conversion to digital.

10 Claims, 4 Drawing Figures

FAST DATA ACQUISITION SYSTEM

BACKGROUND OF THE INVENTION

The invention described herein was made in the course of or under Contract AT(29-1)-1183 with the Atomic Energy Commission.

This invention relates to data acquisition systems and more particularly to a data acquisition system which provides very high resolution of transient pulses of bandwidth greater than one gigahertz and has a dynamic range in excess of 1,000:1.

Obtaining detailed information on extremely fast, singly occurring, transient electrical signals is of interest in a number of fields. In the field of testing nuclear explosives, analysis of pulses generated by nuclear radiation sensitive detectors is of critical importance in the evaluation of the performance of the explosive.

It has been common practice in the nuclear testing field to record signals of this type on high speed, single transient, recording oscilloscopes. However, since such oscilloscopes are limited in the dynamic range of signal intensity they can record, a common range being 150:1, several oscilloscopes are required to measure the output of the radiation detectors which commonly have a signal dynamic range of more than 1,000:1. Moreover, analysis of the trace of the pulse, or portion thereof, projected upon the oscilloscope face generally involves making a photographic recording of the trace by camera. That photographic record is thereafter processed and analyzed. It will be appreciated that a photographic type record of data does not readily lend itself to digital storge, analysis and other processing by digital computers without substantial further processing. This essentially eliminates the possibility of analyzing the data on a substantially real time basis.

Totally electronic sampling systems not utilizing oscilloscopes have been proposed for use in measuring these high speed single transient events and, if successful, would eliminate problems associated with processing data in photographic form. However, generally speaking, they have been limited in fidelity due to their being directly connected to the electrical signal being measured. This causes the signal to become distorted due to the small portion of sampling pulse injected into the signal path and to the loading effects of the sampling elements on it. Also, the characteristics of the sampling elements may change in an unpredictable manner due to amplitude changes in the signal being sampled, thereby further distorting the measurements. Moreover, unexpectedly large signal voltage amplitudes can actually destroy the sensitive, directly coupled, sampling elements.

In view of the foregoing, we have discovered a fast data acquisition system that overcomes many of the inadequacies associated with the oscilloscope systems and the totally electronic systems heretofore proposed. The output of our system is readily processible in digital form on an essentially real time basis. Our system makes practical dynamic ranges in excess of 1,000:1 as opposed to the oscilloscope range of 150:1. The fidelity of our system is not affected by the sampling process utilized. The sampling process does not affect the signal being measured nor are the sampling elements endangered by large signal voltages. The sensitive sampling circuitry of our system is completely decoupled from the signal circuit and thereby from electrical ground currents and other sources of noise that may exist on the signal cable.

SUMMARY OF THE INVENTION

Accordingly, an object of the invention is to provide a high speed data acquisition system which provides very high resolution of transient pulses over a wide bandwidth. It is another object of the invention to provide a high speed data acquisition system the output of which is readily convertible to digital recording and processing.

Briefly summarized, the above and additional objects are accomplished by applying the signal to be recorded as a traveling wave in a longitudinally extending electro-optical modulator, transmitting short light pulses to a plurality of locations along one side of the longitudinally extending modulator and receiving the modulated light pulses passed through the modulator on the opposite side. The intensity of the light pulses received at the opposite side is a function of the electric field existing at those particular locations of the modulator cell. The magnitude of the field intensities at points along the modulator cell are, in turn, representative of the amplitude of the transient pulse at those locations. Of course, the field intensity at any particular point along the modulator varies with time as the transient pulse proceeds down the modulator cell.

The output of the photodetectors which receive the pulses on the opposite side of the modulator are electrical analogs of the intensity of the light received. These are accumulated in appropriate charge hold circuitry and are available for further processing such as conversion to digital values for immediate processing or for transmission to digital storage means from which they may be retrieved for processing at some later time.

As will be further explained hereinafter, the precision with which the display characterizes the signal applied to the electro-optical modulator as a traveling wave is affected by procedures regarding the sequencing and positioning of the light pulses and the physical characteritstics of the various components of the system. However, very good resolution of pulses of bandwidth greater than one gigahertz at a dynamic range of greater than 1,000:1 has been demonstrated.

The electro-optical modulator may be one of several types whose optical response as a function of voltage or current excitation is known, such as a Kerr cell utilizing either liquid or solid dielectric or a Pockels cell. Kerr and Pockels cell devices have an optical transparency in one or more axes that is proportional to the electrical field existing across their electrodes.

The optical pulses that sample the modulator transparency can be generated from a single source having a suitable pulse intensity and width. In this case the pulse is divided by optical means into a plurality of sampling pulses that are located along one side of the modulator. A single pulse may also be switched from a train of pulses typically emitted by a mode-locked gas laser or solid crystal laser or certain semiconductor lasers, and the switched-out pulse optically divided into the needed plurality of pulses.

Alternatively, the sample pulses can be generated by a multiplicity of separate sources where the time of emission and pulse characteristics are known or controllable, such as from individual semiconductor emitters or lasers or other light sources whose outputs are simultaneously distributed along the side of the modulator.

Additional objects and advantages and a better understanding of the invention will be apparent after consideration of the following preferred embodiment.

DESCRIPTION OF A PREFERRED EMBODIMENT

Figure 1:
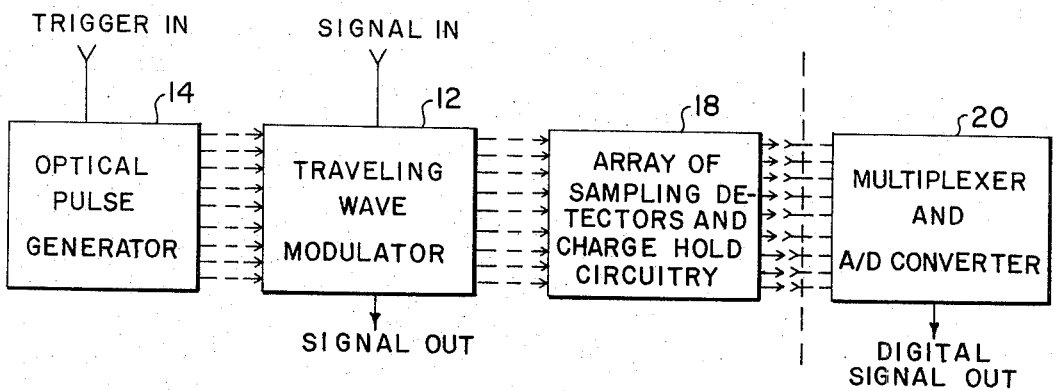
FIG. 1 is a block diagram illustrating the functional components of a preferred embodiment.
Figure 2:
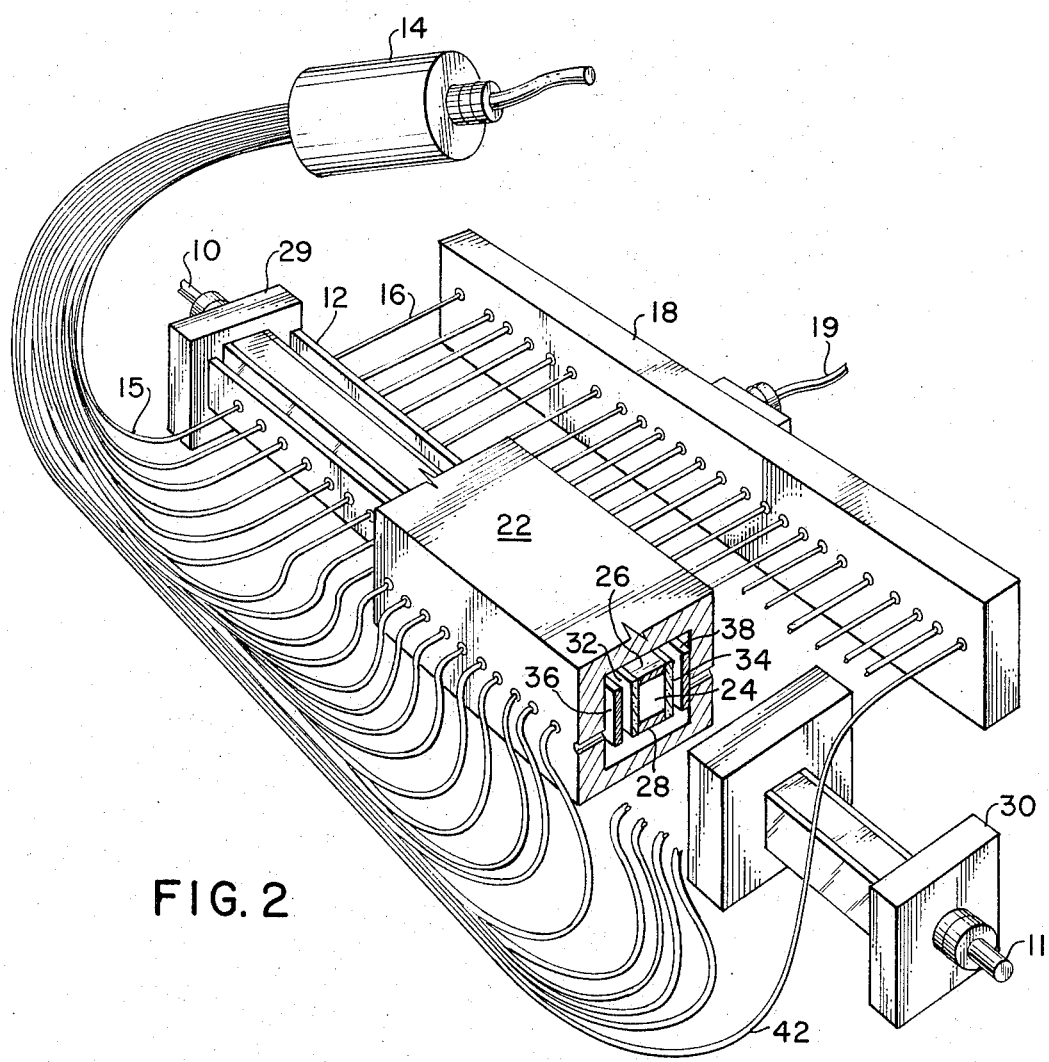
FIG. 2 illustrates a preferred embodiment of an apparatus for practising the invention, shown partially in broken away section.

Referring now to FIGS. 1 and 2 of the drawings, the functional blocks of FIG. 1 and the apparatus of FIG. 2 which performs that function will be identified by identical reference characters. An initial brief overview of the illustrated embodiment will help provide a framework for a complete understanding of the detailed description.

The signal to be recorded is transmitted over coaxial cable 10 from a transducer, not shown, to a longitudinally extending electro-optical modulator 12. The signal proceeds down the length of modulator 12 as a traveling wave at a velocity characteristic of the modulator. Where electro-optical modulator 12 utilizes a Kerr cell with nitrobenzene as the dielectric, that velocity is about 6 nanoseconds (nsec) per foot.

A plurality of individual light pulses which have known or controllable times of emission and are in some way synchronized to the signal, such as by being triggered by the signal, are transmitted from light pulse generator 14 to a plurality of locations along one side (the rearward side) of modulator 12 by suitable means, such as a bundle of fiber optic wave guides, or light guides, 15. The light pulse carried by each individual light guide 15 is directed across modulator 12, is modulated thereby, and the modulated light pulse received by the optic wave guides, or light guides, 16 on the opposite side. The modulated light pulses are then transmitted by light guides 16 to an array of sampling detectors and charge hold circuitry 18 wherein the individual light pulses are detected and converted to electrical analogs which are stored for subsequent multiplex transmission (through cable 19), conversion to digital and digital processing as represented by function block 20 of FIG. 1.

Now with respect to more specific aspects of the particular embodiment shown in FIG. 2, electro-optical modulator 12 includes a longitudinally extending Kerr cell 24 having a pair of parallel electrode plates 26 and 28. The necessary transitions between coaxial transmission through cables 10 and 11 and the parallel plate transmission through plates 26 and 28 are provided by connector blocks 29 and 30. Coaxial cable 11 is terminated in its characteristic impedance in order to completely dissipate the signal energy thereby preventing it from being reflected back into the line where it would distort the signal existing thereon. A longitudinally extending mounting block 22, only a portion of which is shown, is preferably used to enclose that length of the Kerr cell through which the light pulses are transmitted.

The cell electrodes are preferably of a nickel alloy and in one embodiment were one-eighth inch by one-eighth inch in cross-section with a 2 mm gap therebetween. Electrodes 26 and 28 are fastened such as by means of a synthetic resin base bonding cement to a pair of transparent, optical window side walls 32 and 34, made of dielectric material such as glass, to form a longitudinally extending, essentially fluid tight rectangular tube. A Kerr dielectric liquid such as nitrobenzene fills the rectangular cell 24.

While nitrobenzene has proven to be a satisfactory Kerr liquid, the differing modulating and/or impedance characteristics obtainable through use of dielectric materials other than nitrobenzene may be very beneficial in some applications. For instance, the use of orthodichlorobenzene would permit operation of the cell at a standard 50 ohm impedance as opposed to the lower cell impedance realized with the high dielectric-coefficient nitrobenzene. However, the Kerr coefficient of ortho-dichlorobenzene is lower than than of nitrobenzene and, therefore, a signal of a given voltage intensity would effect a lesser change in transmission characteristics. Accordingly, the selection of a dielectric liquid for a particular application can be made through matching the performance requirements to be placed upon the electro-optical modulator with the characteristics of particular Kerr liquids.

The usual polarizer 36 and analyzer 38 are parallel to rear optical window 32 and forward optical window 34 of the Kerr cell, respectively. Maintaining an optically clear, high-dielectric-strength fluid, such as silicon oil, in the space within mounting block 24 not occupied by the Kerr cell, polarizer and analyzer provides a number of advantages. It reduces the potential for leakage of the Kerr liquid from the Kerr cell, provides reflection-free coupling of the optical pulse between light guide, polarizers and cell surfaces, and provides a high thermal inertia which facilitates the regulation and maintenance of the temperature of the cell package.

Optical pulse generator 14 may be the "Coaxial Short Pulsed Laser" of U.S. Application Ser. No. 431,817, filed on Jan. 8, 1974 in the names of Melvin A. Nelson and Terence J. Davies as joint inventors and co-assignors to the assignee of the instant application. The electrically pulsed neon laser described therein produces an essentially monochromatic optical pulse at about 614 nanometers (nm) having a peak of about 120 watts (w) and an indicated full width at its half maximum amplitude points (FWHM) of about 300 picoseconds (psec) with a time predictability to within 1 nsec when filled with neon gas. The 614 nm wavelength of this pulse is a good match for the nitrobenzene dielectric since nitrobenzene is essentially transparent to that wavelength.

In one particular combination of apparatus utilizing the teaching herein, single optical pulses produced by the short pulsed laser were divided into 20 individual pulses by a bundle of 20 low loss fiber optic light guides 15. Since light guides with an optical loss rate as low as 20 decibels (db) per 1,000 meters are now commercially available, they provide a very efficient means of dividing a single optical pulse into a number of individual pulses. The pulses were directed across the Kerr cell at an angle of 90° with respect to the longitudinal axis of the cell. It is possible, of course, to direct the light across the Kerr cell at an angle that would match the velocity of the optical pulse with that of the electrical signal and thereby minimize any distortion due to "time smear." However, where the sampling pulse times are greater than about 50 to 100 psec, as in the related instance, distortion due to this effect is minimal.

It will be noted from FIG. 2 that light guide pairs 15 and 16 at the rearward and forward sides of modulator 12, respectively, do not extend the entire length of Kerr cell 24. It has been found that highest frequency performance is obtained by sampling nearest the input end of the traveling wave Kerr cell before the high frequency signal components are degraded by losses in the dielectric since the frequency response varies approximately according to the relationship:

$$f_2/f_1 \simeq \sqrt{L_1/L_2}$$

The frequency response of a 20-inch Kerr cell at 100°C has been found to be about 2 GHz at 1.25 inches from signal input, 1.0 GHz at 5 inches and only 0.5 GHz at 20 inches. Accordingly, when the frequency of the signal to be recorded is, or may be, higher than the frequency to which some portion of the Kerr cell can respond, it would be clearly advantageous to concentrate the sampling of the signal in a portion of the Kerr cell that is capable of the required response. Judicious use of wave guides 15 can provide an accommodation in that regard.

It will be noted from FIG. 2 that light guides 15 are of increasing length as they proceed from the signal input end toward the signal output end of longitudinally extending Kerr cell 24. It will be appreciated that were light guides 15 all the same length, each of the individual light pulses transmitted through guides 15 would proceed across the Kerr cell at the same time. The individual sampling intervals in that case would then be determined by the transit time of the electrical signal through the Kerr liquid longitudinally down the cell between the physical locations of individual sampling points. In the 20-inch nitrobenzene Kerr cell previously mentioned, a total sampling interval of about 8 nsec of the electrical signal could be obtained at any one firing of optical pulse generator 14 is sampling were carried out over the entire length of the tube. However, if the characteristics of the transient pulse to be recorded require that sampling be limited to that region of the Kerr cell where better than 1.0 GHz frequency response can be obtained, i.e., the first 5 inches of a 20-inch Kerr cell, only 2 nsec of signal could be sampled at any one firing of optical pulse generator 14. This apparent limitation can be modified by selectively utilizing wave guides 15 of differing lengths.

Since each centimeter of wave guide length represents an optical delay of about 55 psec, the sampling sequence and interval can be determined by a selection of the lengths of wave guides 15. For example, if, as in FIG. 2, each succeeding wave guide 15 from signal input end toward signal output end of the Kerr cell were longer by 6 cm, the effective individual sampling intervals between adjacent wave guides would be 6 × 55 psec minus the transit time of the electrical signal between the adjacent points. If on the other hand, each succeeding wave guide 15 from signal input end toward signal output end were shorter by the same 6 cm, the effective individual sampling interval would be 6 × 55 psec plus the electrical signal transit time.

It can be seen then, that it is possible to achieve a great deal of flexibility in individual sampling intervals by a selection of lengths of wave guides 15. In addition, sampling points can be located much closer together when adjacent optical pulses are not transmitted simultaneously thereby facilitating the concentration of sampling points at the signal input end of the Kerr cell. Care must be taken, however, not to place sampling points so close together as a result in any particular wave guide 16 receiving dispersed light from adjacent optical pulses.

The modulated optical pulses received by wave guides 16 at the forward side of the Kerr cell are transmitted thereby to detector array 18. Where very short sampling light pulses are employed of nanoseconds or less duration, it is beyond the current state of the art to accurately convert the sampling detector charge output directly to a digital value. Instead, the charge generated in proportion to the optical sampling pulse intensity incident on the detector is integrated in a track-and-charge-hold circuit, such as that of FIGS. 3 and 4, which will be further described hereinafter. The circuit holds the charge value for a time sufficient for analog-to-digital circuitry to convert the charge to a digital value.

The portion of light pulse carried by one (or more) guide designated the reference channel 42 is passed directly to a sampling detector and charge hold circuitry without transitting the modulator. The intensity measured at each sampling channel is compared to this reference channel intensity to determine the modulation at each sampling point due to the electrical signal. This comparison technique yields a difference measurement and makes possible high measurement accuracy and a high resolution that is not obtainable using other modulation evaluation techniques. For example, changes in intensity of the generated light pulse from measurement to measurement would not be distinguishable from a modulation-induced change in detected intensity unless a reference intensity were established for comparison. Hence, a measurement error would occur and measurement resolution would be dependent upon the variation in light source intensity from pulse to pulse. The accuracy advantage inherent in the difference measurement technique, on the other hand, is well established by those familiar with the measurement arts.

In the case where the source of the light pulses transmitted through light guide 15 is a multiplicity of individual light pulses, a reference channel is created for each source by dividing its light pulse into two portions and directing one across the modulator and modulating it according to the signal and passing the other, designated a reference channel, directly to a sampling detector and electronic circuitry without transitting the modulator. The electrical outputs of the two channels are compared using a conventional comparator circuit whose output is the difference of the two and thereby represents the signal-induced intensity difference. Alternatively, each output is separately digitized and recorded and the values are later compared.

Figure 3:
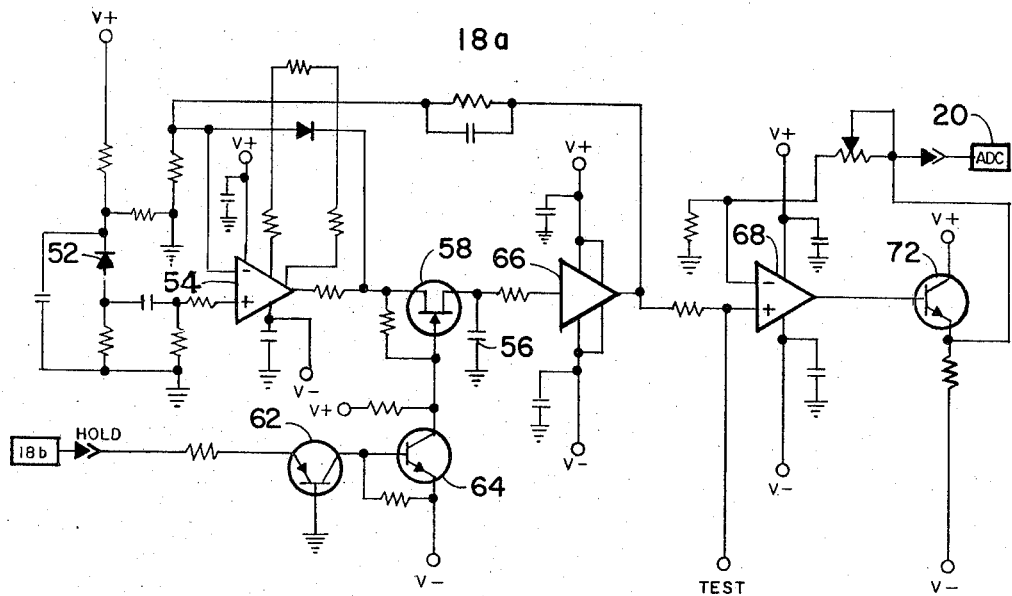
FIG. 3 is a diagram of a typical circuit for processing the optical data received by the preferred embodiment.
Figure 4:
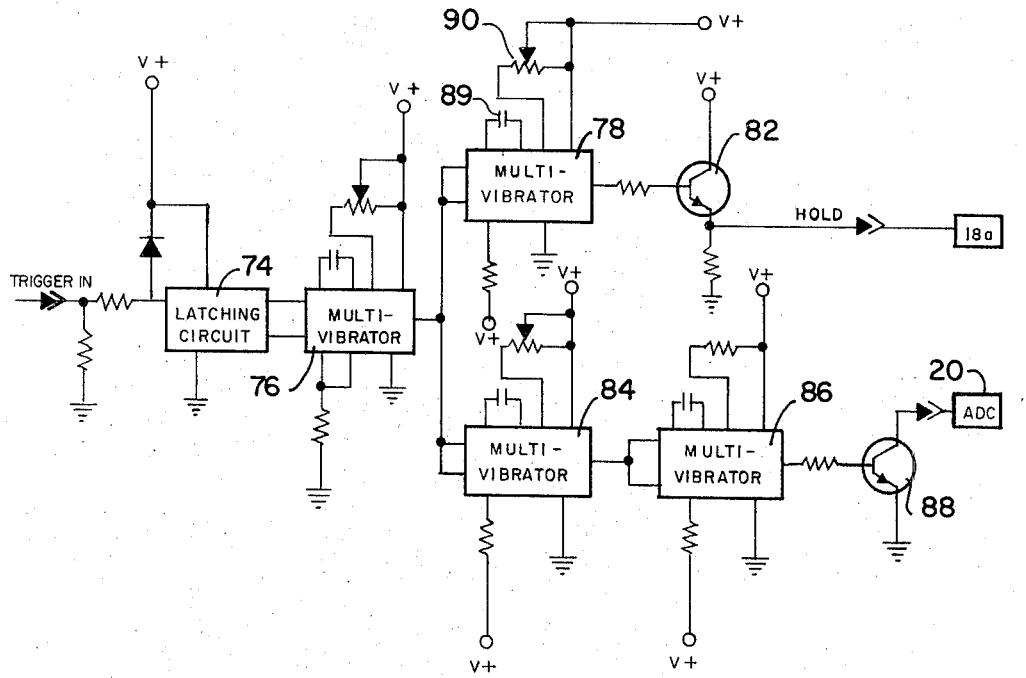
FIG. 4 is a diagram of an additional circuit utilized in connection with the circuit of FIG. 3.

FIGS. 3 and 4 show the basic combination of electronic circuit elements making up a typical sampling detector and charge hold circuitry of array 18. Looking now to circuit 18a of FIG. 3, the light from a wave guide 16 is received by a light detector, or photodiode, 52. The output of detector 52 due to the photon flux input is ac coupled to operational amplifier 54 where it is amplified and applied across tracking capacitor 56 through series FET transistor switch element 58. At an appropriate time following input of the photon flux, which time allows amplifier 54 (the response of which is characteristically slower than that of light detector 52) to reach its full amplification level, a Hold command signal is generated in circuit 18b of FIG. 4, in a manner to be described, and applied to series switch 58 after amplification by transistors 62 and 64. This causes switch 58 to appear as a very high impedance which effectively disconnects tracking capacitor 56 from amplifier 54 for the duration of the Hold command.

The voltage across capacitor 56, which is proportional to its charge, is thereby stored during the duration of the Hold command since there is no direct discharge path for the charge. This voltage appears across the input to buffer amplifier 66, which has a high input impedance so as not to significantly dissipate the voltage across capacitor 56, during the duration of the Hold signal. The output of buffer amplifier 66 is now seen to be a signal whose amplitude is proportional to the photon flux input to light detector 52. The output of buffer amplifier 66 can be routed directly to multiplexer and analog to digital converter circuit 20, or if the ADC conversion unit is not sufficiently sensitive, it can be further amplified first, such as by operational amplifier 68 and transistor 72.

Referring now to circuit 18b shown in FIG. 4, the trigger signal is received by latching circuit 74 (which is a combination of NAND gates) which insures triggering of monostable multivibrator 76. The output of multivibrator 76 is developed into the Hold signal utilized in circuit 18a, described above, through monostable vibrator 78 and transistor 82 and an enabling signal for the analog digital converter unit through monostable vibrators 84 and 86 and transistor 88. The time delay at which it is desired that the monostable multivibrators produce their output is controlled by adjustment of their respective RC time constants, an example of which is capacitor 89 and resistor 90 in the circuit of multivibrator 78. Following the digitization of each signal from circuit 18a, the Hold signal terminates and the circuitry resets to receive another input sequence.

While the fundamental novel features of the invention have been shown and described and pointed out as applied to an embodiment particularly described, it will be readily appreciated by those skilled in the art that various omissions and substitutions and changes may be made within the principle and scope of the invention as expressed in the appended claims.

What we claim is:

1. A high speed data aquisition system comprising:
   a. a longitudinally extending electro-optical modulator having means for transmitting an electrical signal to be recorded as a traveling wave longitudinally therewithin,
   b. means for transmitting a plurality of optical pulses to a plurality of locations along one side of said longitudinally extending modulator, and
   c. light detector means positioned on the opposite side of said modulator in alignment with said locations for receiving light transmitted through said modulator.

2. The combination of claim 1 including electrical circuit means for producing electrical analogs corresponding to the intensity of the light pulses received on said opposite side of said modulator.

3. The combination of claim 1 wherein said longitudinally extending modulator includes a Kerr cell.

4. The combination of claim 3 wherein the Kerr liquid is nitrobenzene.

5. The combination of claim 1 including means for producing an optical pulse and means for dividing said single optical pulse into a plurality of optical pulses for transmission by said transmitting means.

6. The combination of claim 5 wherein said transmitting means are a plurality of individual light paths.

7. The combination of claim 5 wherein said plurality of locations are concentrated at the signal input end of said modulator.

8. The combination of claim 6 wherein said transmitting means are a plurality of individual light guides.

9. The combination of claim 8 wherein at least some of said plurality of light guides are of differing length.

10. The combination of claim 9 including electrical circuit means for producing electrical analogs corresponding to the intensity of the light pulses received on said opposite side of said modulator.

* * * * *